US012508699B2

(12) United States Patent
Liang et al.

(10) Patent No.: US 12,508,699 B2
(45) Date of Patent: Dec. 30, 2025

(54) ROTARY DRIVE ASSEMBLY OF AN ELECTRIC NAIL GUN

(71) Applicant: DE POAN PNEUMATIC CORP., New Taipei (TW)

(72) Inventors: Chia-Sheng Liang, New Taipei (TW); I-Tsung Wu, New Taipei (TW); Ying-Chieh Liu, New Taipei (TW); Yu-Che Lin, New Taipei (TW)

(73) Assignee: DE POAN PNEUMATIC CORP., New Taipei (TW)

( * ) Notice: Subject to any disclaimer, the term of this patent is extended or adjusted under 35 U.S.C. 154(b) by 0 days.

(21) Appl. No.: 18/813,412

(22) Filed: Aug. 23, 2024

(65) Prior Publication Data

US 2025/0303542 A1 Oct. 2, 2025

(30) Foreign Application Priority Data

Mar. 26, 2024 (TW) ................................ 113111265

(51) Int. Cl.
*B25C 1/06* (2006.01)

(52) U.S. Cl.
CPC .................................... *B25C 1/06* (2013.01)

(58) Field of Classification Search
CPC ....................................................... B25C 1/06
See application file for complete search history.

(56) References Cited

U.S. PATENT DOCUMENTS 4,161,272 A * 7/1979 Brockl ...................... B25C 1/06 227/147
4,323,127 A * 4/1982 Cunningham ............ B25C 1/06 124/78
7,285,877 B2 10/2007 Gorti et al.
7,506,788 B2 * 3/2009 Liang ........................ B25C 1/06 227/129
7,575,141 B1 * 8/2009 Liang ........................ B25C 1/06 173/205
7,575,142 B2 8/2009 Liang et al.
8,991,675 B2 * 3/2015 Liang ..................... B25D 11/00 227/129
2002/0161405 A1 10/2002 Drake
2008/0257933 A1 * 10/2008 Takahashi ................. B25C 1/06 227/129
2009/0032567 A1 * 2/2009 Liang ........................ B25C 1/06 227/131

(Continued)

*Primary Examiner* — Lucas E. A. Palmer
(74) *Attorney, Agent, or Firm* — LANWAY IPR SERVICES; Chun-Ming Shih

(57) ABSTRACT

A rotary drive assembly of an electric nail gun, comprising a support seat configured on a gun frame, an inner-rotor brushless DC motor and a flywheel configured inside the support seat in a coaxial manner. Along an assembly axial direction, the support seat is formed with a motor housing chamber to house the brushless DC motor and a flywheel housing chamber to house the flywheel, the two chambers being separated from each other. The motor housing chamber is formed with an axial port for assembly and heat dissipation of the brushless DC motor. The flywheel housing chamber is formed with a radial port to expose part of the flywheel outside the support seat. The axial port is perpendicular to the radial port. The invention can simplify the structure of the rotary drive assembly and facilitate its assembly and heat dissipation.

21 Claims, 6 Drawing Sheets

(56) References Cited

U.S. PATENT DOCUMENTS

| | | | | |
|---|---|---|---|---|
| 2009/0095787 | A1 * | 4/2009 | Liang | B25C 1/06 227/131 |
| 2010/0213232 | A1 * | 8/2010 | Krondorfer | B25C 5/15 227/129 |
| 2011/0259938 | A1 * | 10/2011 | Chien | B25C 1/06 227/129 |
| 2013/0255447 | A1 * | 10/2013 | Po | B25B 23/045 81/57.11 |
| 2014/0076953 | A1 * | 3/2014 | Ekstrom | B25F 5/008 227/129 |
| 2015/0034345 | A1 * | 2/2015 | Po | B25C 1/06 173/46 |
| 2016/0023341 | A1 * | 1/2016 | Gross | B25C 1/06 173/117 |
| 2017/0100828 | A1 * | 4/2017 | Chien | B25C 1/06 |
| 2022/0371166 | A1 | 11/2022 | Chien | |

* cited by examiner

ROTARY DRIVE ASSEMBLY OF AN ELECTRIC NAIL GUN

BACKGROUND OF INVENTION

1. Field of the Invention

The present invention relates generally to the assembly of a component to generate rotational kinetic energy for an electric nail gun, and more particularly to a rotary drive assembly of an electric nail gun.

2. Description of Related Art

An electric nail gun is normally configured with a drive assembly to generate rotational kinetic energy. The drive assembly usually comprises an inner-rotor DC motor and a flywheel that is driven by the inner-rotor DC motor to rotate. The flywheel stores rotational kinetic energy. During the course of nailing operation, the flywheel is engaged with a striker and transmits the rotational kinetic energy to the striker, so that the striker can immediately generate a linear nailing force to successfully complete the operation of nailing.

The prior art of assembly techniques of a drive assembly to generate rotational kinetic energy is disclosed in U.S. Pat. No. 7,575,142B2 and U.S. Pat. No. 8,991,675B2, as briefly introduced below:

According to U.S. Pat. No. 7,575,142B2, a swing seat provides a chamber to house the inner-rotor DC motor connected with the flywheel in a coaxial manner, thus forming a drive assembly that can generate the rotational kinetic energy.

In U.S. Pat. No. 8,991,675B2, the inner-rotor DC motor and the flywheel are separately configured on a support seat, not connected in a coaxial manner. The inner-rotor DC motor drives the flywheel through a belt to generate the rotational kinetic energy to drive the striker (or nailing rod) to generate a linear nailing force to fire the nail.

Moreover, common inner-rotor brushless DC motors all comprise an outer-ring stator and an inner rotor configured concentrically. In U.S. Pat. No. 7,575,142B2, the inner-rotor brushless DC motor is not provided with a shell, and the outer-ring stator and the inner rotor are directly hidden inside the chamber, whereas in U.S. Pat. No. 8,991,675B2, the inner-rotor DC motor is provided with a motor shell to enclose the outer-ring stator and the inner-ring rotor, to similarly hide the outer-ring stator and the inner-ring rotor.

In long-term nailing operation, because the drive assembly constantly transmits rotational kinetic energy to the striker, high temperature will be generated between the inner rotor and the outer-ring stator wound with coils. Therefore, patent U.S. Pat. No. 7,575,142B2 relies on the wall of the chamber of the swing seat to provide heat dissipation for the inner rotor and the outer-ring stator, whereas patent U.S. Pat. No. 8,991,675B2 relies on the motor shell to provide heat dissipation for the inner rotor and the outer-ring stator. Obviously, both of the above two patents have the problem of poor heat dissipation for the inner rotor and the outer-ring stator.

To overcome the above problem of poor heat dissipation for the motor, a fan is often installed beside the motor. However, this will increase the overall size of the rotary drive assembly and cause a burden to the motor output. This is obviously not a good solution.

In addition, in U.S. Pat. No. 7,575,142B2, as the inner-rotor DC motor is enclosed by the swing seat chamber, the assembly becomes very inconvenient.

In U.S. Pat. No. 8,991,675B2, as the inner-rotor DC motor and flywheel are connected by a belt for transmission, not configured in a coaxial manner, the relatively complicated structure makes it difficult to reduce the overall size of the rotary drive assembly.

SUMMARY OF THE INVENTION

In view of the technical problem of the above-mentioned prior art, and based on years of professional experience in designing nail guns, the inventor of the present invention tries to enhance the efficiency of heat dissipation to improve the durability of the electric nail gun, and meanwhile reduce the overall size of the electric nail gun to provide a more compact structural design.

For this purpose, a preferred embodiment of the present invention provides a rotary drive assembly of an electric nail gun, configured on a gun frame to drive a striker to fire a nail. The rotary drive assembly comprises: an inner-rotor brushless DC motor, a flywheel and a support seat for configuration of the inner-rotor brushless DC motor and the flywheel. Along an assembly axial direction, the support seat is formed with a motor housing chamber and a flywheel housing chamber, adjacent to but separated from each other. The inner-rotor brushless DC motor comprises an outer-ring stator and an inner rotor configured concentrically. The outer-ring stator is fixed on an axial inner wall of the motor housing chamber, used to actuate the inner rotor to generate rotational kinetic energy. The flywheel is housed inside the flywheel housing chamber, and is connected via a transmission shaft with the inner rotor along the assembly axial direction. Specifically, the motor housing chamber has an axial port along the assembly axial direction open to the outside. The axial port is formed by extending the axial inner wall outward. The flywheel housing chamber has a radial port in the radial direction of the assembly axis open to the outside. The radial port exposes part of the flywheel outside the support seat, for engagement with the striker to fire a nail, and the axial port is perpendicular to the radial port.

In a further embodiment, the brushless DC motor can be a non-sensing brushless DC motor or a sensing brushless DC motor. When the brushless DC motor is a sensing brushless DC motor, it further comprises a sensor installed on the axial port to detect the position of the inner rotor in relation to the outer-ring stator. For this purpose, the gun frame is correspondingly configured with a micro-controller that is electrically connected to the sensor. The micro-controller is used to process a feedback signal from the sensor detecting the position of the inner rotor in relation to the outer-ring stator, and based on the feedback signal, the micro-controller drives the inner rotor to rotate. Specifically, the sensor can be a Hall sensor, a resolver, or an encoder.

In a more detailed embodiment, the gun frame is fixed with an electromagnet, the support seat can be implemented as a swing arm pivoted on the gun frame. A return spring is configured between the swing arm and the gun frame. Specifically, the swing arm is driven by the electromagnet to swing and drives the return spring to store an elastic force, causing the flywheel to swing from an idle position to a driving position to be engaged with the striker to fire a nail. The swing arm also receives the elastic force released by the return spring to move the flywheel from the driving position back to the idle position.

Based on the above descriptions, the structural features and the enhanced effects of the invention include the following:

1. The brushless DC motor is placed into the motor housing chamber via the axial port, the flywheel is placed into the flywheel housing chamber via the radial port, the transmission shaft can be put through the motor housing chamber and the flywheel housing chamber along the assembly axial direction, and be coaxially connected with the brushless DC motor and the flywheel to form an integral body. Most specially, for the brushless DC motor, the axial port not only provides convenience for assembly, but also meets the requirement for heat dissipation of the outer-ring stator and the inner-ring rotor.

2. The support seat is formed with a radial inner wall, and the motor housing chamber and the flywheel housing chamber are separated by the radial inner wall and are adjacent to each other. Furthermore, the radial inner wall is formed with an inner hole to fix a built-in bearing, the built-in bearing is used for pivot connection of the transmission shaft so that the transmission shaft can be put through the inner hole and the radial inner wall to be connected with the inner rotor and the flywheel for transmission. In addition, along the assembly axial direction, the support seat is formed with an end hole corresponding to the inner hole. The end hole is used for fixing an end bearing, so that the transmission shaft can be pivoted between the end bearing and the built-in bearing to link and drive the inner rotor and the flywheel, and the flywheel housing chamber can be positioned between the end bearing and the built-in bearing. Based on the above implementation, under the condition that stable pivot connection and rotation of the transmission shaft are maintained, the overall size of the motor housing chamber can be effectively reduced, and the whole rotary drive assembly can become light and compact.

Further benefits and advantages of the present invention will become apparent after a careful reading of the detailed description with appropriate reference to the accompanying drawings.

DETAILED DESCRIPTION OF THE INVENTION

Figure 1:
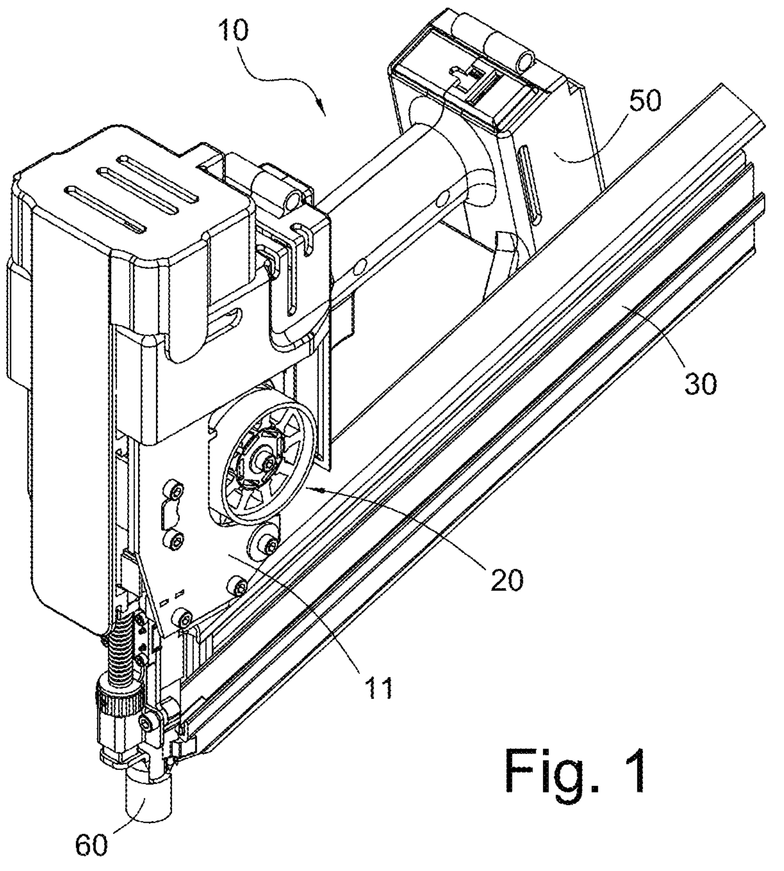
FIG. 1 is a perspective view of a preferred embodiment of the electric nail gun according to the present invention.
Figure 2:
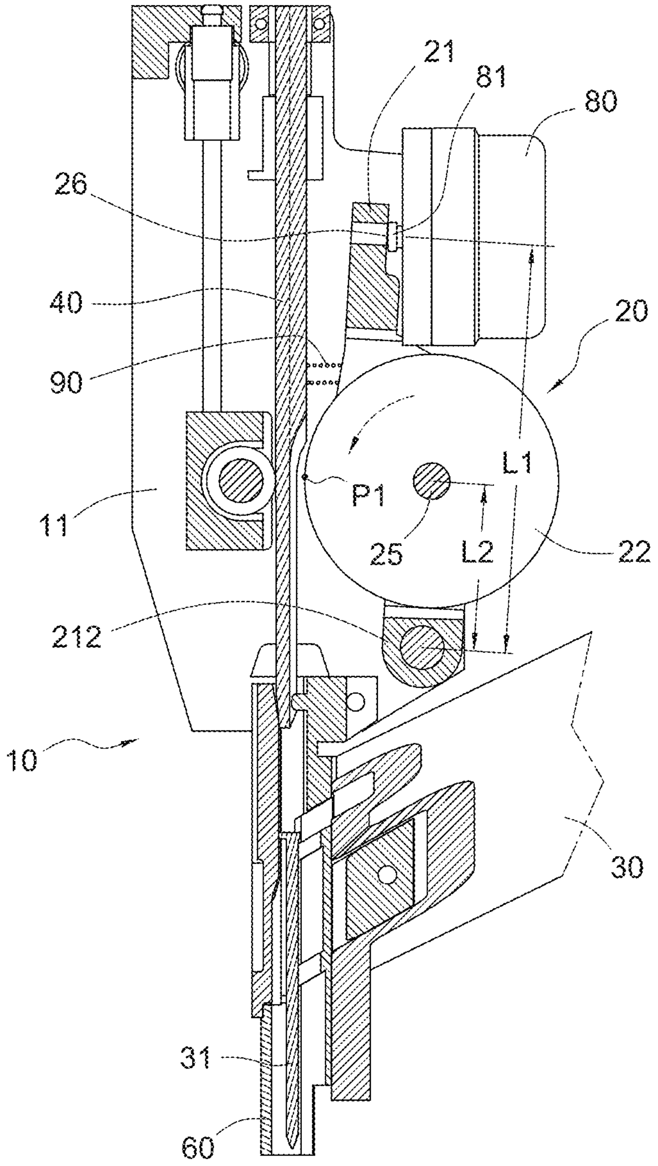
FIG. 2 is a partially sectional view of the electric nail gun in FIG. 1, showing the rotary drive assembly configured inside the electric nail gun, wherein the flywheel is at the idle position, still not engaged with the already reset striker.
Figure 3:
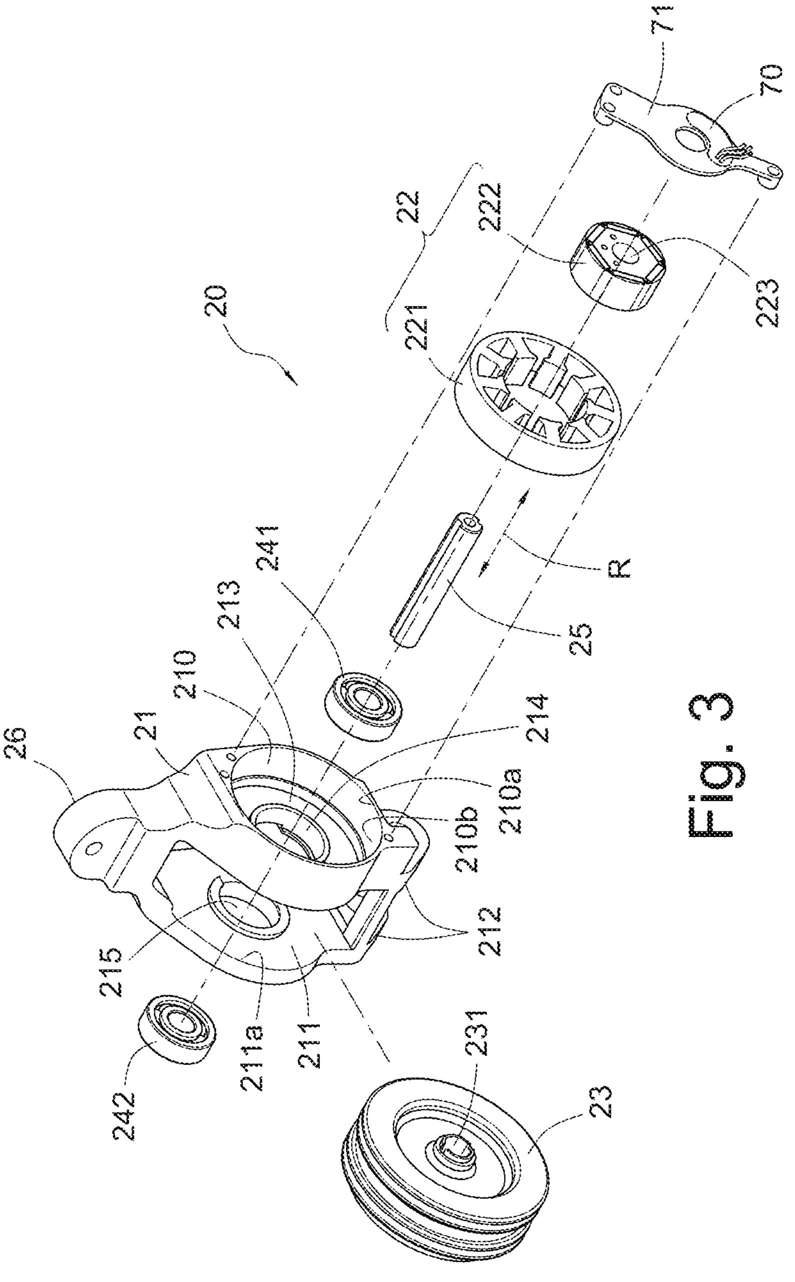
FIG. 3 is an exploded perspective view of the rotary drive assembly in FIG. 2.
Figure 4:
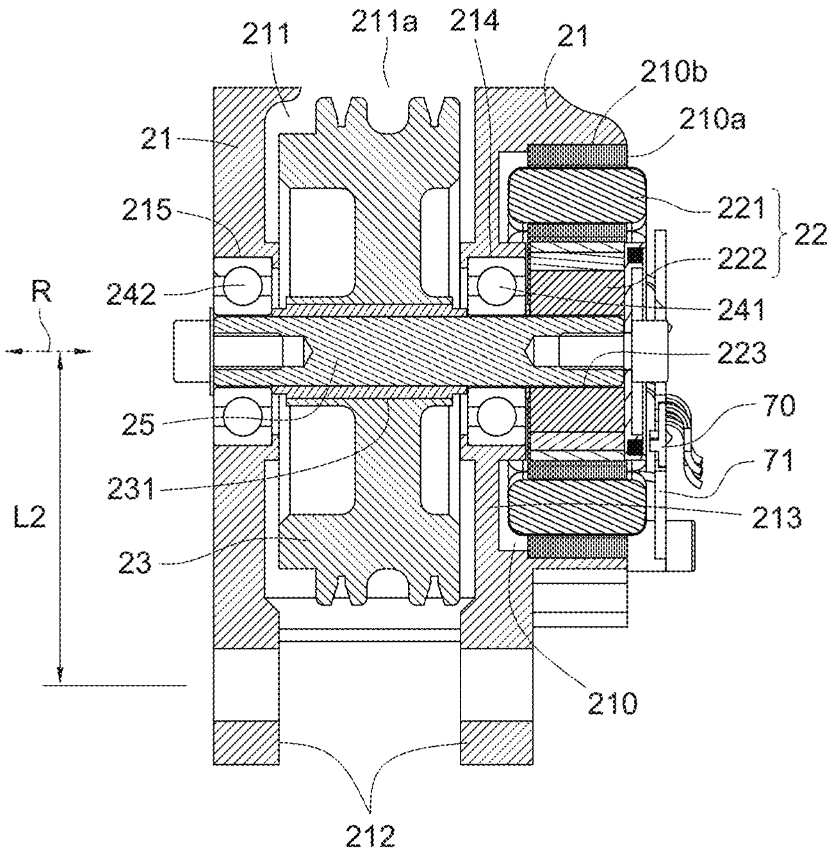
FIG. 4 is a sectional plane view of the rotary drive assembly in FIG. 2.

FIG. 1 discloses an electric nail gun 10 as an embodiment of the present invention. FIGS. 2 to 4 disclose the structural details of the rotary drive assembly 20 of the invention configured in the electric nail gun 10.

As disclosed in FIG. 1, the electric nail gun 10 has a gun frame 11 that can be used for fixation of components, and the components configured on the gun frame 11 can include the rotary drive assembly 20 of the invention, a nail cartridge 30 for charging nails, a striker 40 (depicted in FIG. 2) for firing nails, and a battery 50 to supply electric power. The battery 50 can provide electric power to actuate the rotary drive assembly 20 to generate rotational kinetic energy. Through engagement with the rotary drive assembly 20, the striker 40 can fire the nails charged inside the nail cartridge 30 out of a shooting nozzle 60 configured on the gun frame 11, one after another, to the work piece to be nailed. In addition, other components configured on the gun frame 11 can be understood through and supported by the known structure of a conventional electric nail gun 10, and are therefore not detailed herein.

Based on FIG. 2 and further referring to FIG. 3, the rotary drive assembly 20 comprises a support seat 21 and an inner-rotor brushless DC motor 22 and a flywheel 23 configured inside the support seat 21. FIG. 2 further discloses the configuration of the rotary drive assembly 20 on the gun frame 11 and its position in relation to the striker 40 and the nail 31.

One function of the support seat 21 is to provide a base for assembly and transmission connection of the rotary driver (such as the inner-rotor brushless DC motor 22 focused on by the present invention) and the flywheel 23 to form an integral body, so that the rotary driver can drive the flywheel 23 to generate rotational kinetic energy.

Another function of the support seat 21 is to bear the rotational kinetic energy of the flywheel, so as to drive the striker 40 to generate a linear nailing force. For this purpose, the implementation of the support seat can be roughly divided into two types:

First type: The support seat 21 is made to swing or move linearly back and forth to drive the flywheel 23 to be at an idle position or a driving position. To implement this design, as disclosed in FIG. 2, a swing arm (or swing seat) that can drive the flywheel 23 to swing can be used as a preferred structure of the support seat 21. Alternatively, a guide seat that can drive the flywheel 23 to move linearly [not shown in the figure, but disclosed in U.S. Pat. No. 8,991,675B2] can be used as an implementation of the support seat 21.

Figure 5:
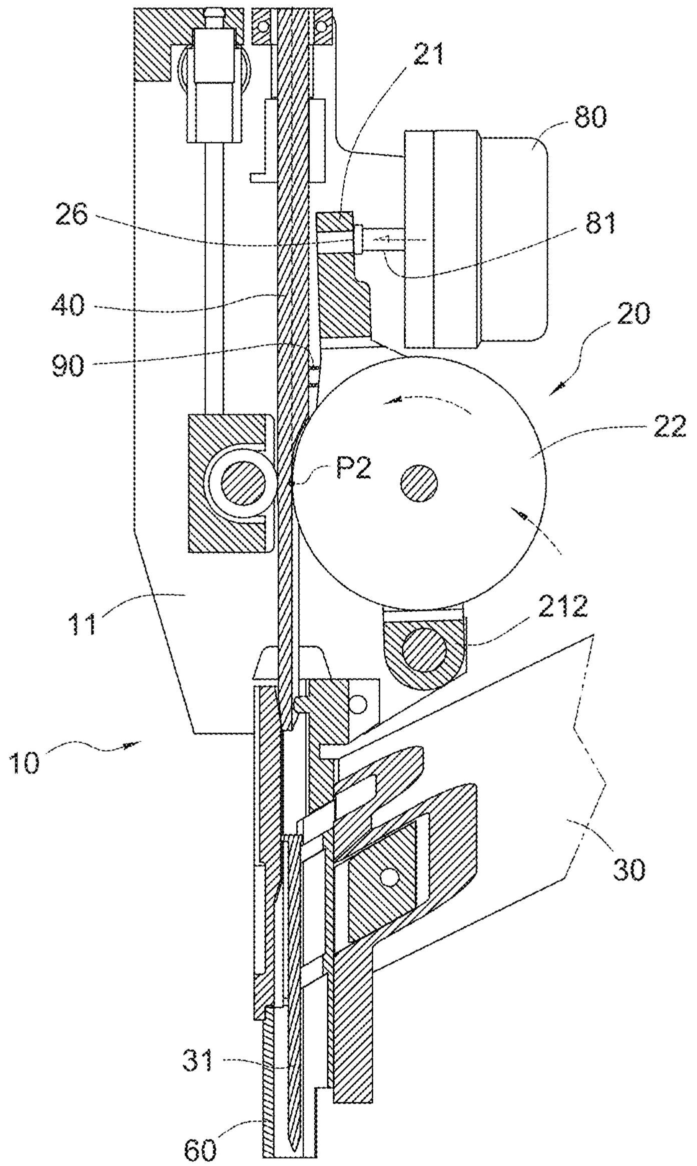
FIG. 5 is an action view of the rotary drive assembly in FIG. 2, showing the flywheel is engaged with the striker.
Figure 6:
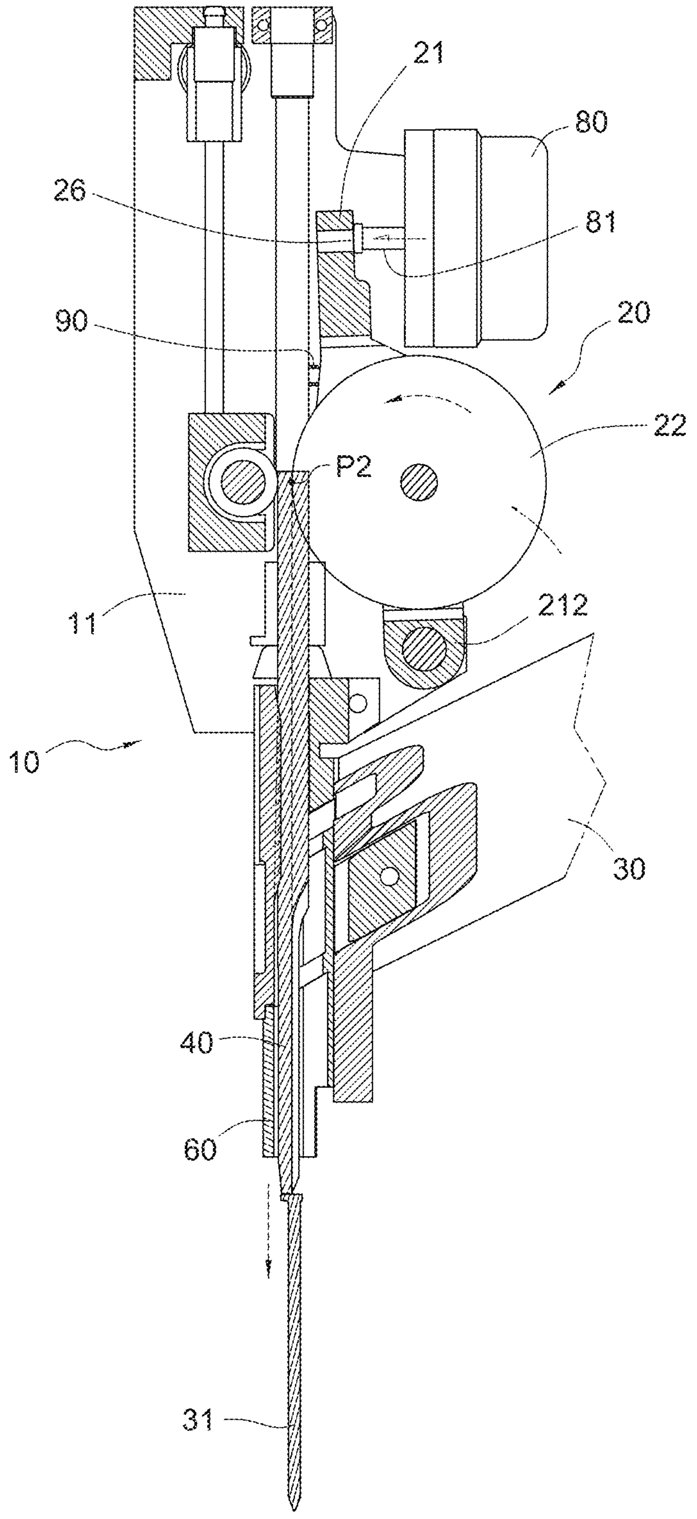
FIG. 6 is a further action view of the rotary drive assembly in FIG. 5, showing the flywheel is driving the striker to fire a nail.

As disclosed in FIG. 2, the support seat 21 bears the flywheel 23, and a contact point of the wheel surface of the flywheel 23 is at the idle position P1. Now, the flywheel 23 can be driven by the brushless DC motor 22 to generate rotational kinetic energy. Moreover, as disclosed in FIG. 5, the support seat 21 drives the flywheel 23 to swing toward the configuration position of the striker 40, so that the contact point of the wheel surface of the flywheel 23 can swing from the idle position P1 shown in FIG. 2 to the driving position P2. Now, the flywheel 23 that has stored rotational kinetic energy can be engaged with and drive the striker 40 to generate a linear nailing force to successfully fire the nail 31 (as shown in FIG. 6).

Second type: A fixing seat (not shown in the figure) that can bear the flywheel 23 is used as the implementation of the support seat 21. The fixing seat is not capable of driving the flywheel 23 to swing or move linearly from the idle position P1 to the driving position P2. Furthermore, as disclosed in Patents US2022161405A1 and US2022371166A1, the striker 40 is fit inside a swing seat of a gun frame in a sliding manner along a nailing axial direction, the flywheel 23 is configured on the fixing seat of the gun frame, the fixing seat can only bear the flywheel 23 to rotate at the idle position P1 to store rotational kinetic energy, and the electromagnet drives the swing seat so that the built-in striker 40 can actively swing toward the contact point on the wheel surface of the flywheel 23 to produce the driving position P2, thus forming transmission connection to receive the rotational kinetic energy of the flywheel 23 to fire the nail. This implementation method for the support seat 21 can also be interpreted and applied by the present invention. In other words, in the present invention, the support seat 21 is not limited to the condition of bearing the swing or linear movement of the flywheel 23.

Referring back to FIG. 3, one end of the support seat 21 is formed with a pivoting part 212, and the pivoting part can be formed as a hole or an ear for pivot connection, so that the support seat 21 can be pivoted on the gun frame 11 via the pivoting part 212. The gun frame 11 is fixed with an electromagnet 80 that can drive the support seat 21 to swing. The electromagnet 80 is powered by the battery 50 to drive a push rod 81 to push the support seat 21 to swing. Moreover, a return spring 90 is also configured between the support seat 21 and the gun frame 11. In addition, the above support seat 21 can be formed with a motor housing chamber 210 and a flywheel housing chamber 211 along an assembly axial direction R (indicated by a double-headed arrow with dotted line in FIG. 3 and FIG. 4). The motor housing chamber 210 is formed with an axial port 210*a* along the assembly axial direction R, open to the outside. The brushless DC motor 22 can be fitted inside the motor housing chamber 210 via the axial port 210*a*. Specifically, as depicted in FIG. 2, the push rod 81 pushes a contact part 26 of the support seat 21 so that a first tension arm length L1 is formed between the contact part 26 and the axial line extended from the pivoting part 212, and a second tension arm length l 2 is formed between the axial line along the assembly axial direction R and the axial line of the pivoting part 212. Based on the first tension arm length L1, the electromagnet 80 can drive the support seat 21 to swing toward the configuration position of the striker 40, and based on the second tension arm length l 2, when the support seat 21 swings toward the striker 40, the wheel surface of the flywheel 23 can swing from the idle position P1 (as shown in FIG. 2) to the driving position P2 (as shown in FIG. 5) to drive the striker 40 to fire the nail 31 (as shown in FIG. 6). When firing the nail 31, the return spring 90 is driven by the swing of the support seat 21 toward the striker 40 to store an elastic force. After the nail is shot, the electromagnet 80 is powered off, and the return spring 90 releases the spring force to push the support seat 21 to swing back to its original position, i.e., the flywheel 23 moves from the driving position P2 back to the idle position P1 (as shown in FIG. 2).

Referring back to FIG. 3, the flywheel housing chamber 211 has a radial port 211*a* along the radial direction of the assembly axial direction R (the direction of the normal line of equal circumference of the assembly axial direction R) and open to the outside, so that the axial port 210*a* is perpendicular to the radial port 211*a*. The flywheel 23 can be assembled inside the flywheel housing chamber 211 through the radial port 211*a*, and the radial port 211*a* can expose at least one part of the wheel surface of the flywheel 23 out of the support seat 21 to link and drive the striker 40 to shoot the nail.

The inner-rotor brushless DC motor 22 comprises an outer-ring stator 221 and an inner rotor 222 configured concentrically. Furthermore, the motor housing chamber 210 has an axial inner wall 210*b* enclosing along the assembly axial direction R. The brushless DC motor 22 is fixed on the axial inner wall 210*b* of the motor housing chamber 210 through the outer wall of the outer-ring stator 221. More specifically, the axial port 210*a* is formed by extending the axial inner wall 210*b* outward to facilitate assembly of the brushless DC motor 22.

The inner rotor 222 is wound with multiple coils through a wire, with equal circumference at intervals, so that the inner rotor 222 can be pivoted inside a ring hole formed on the outer-ring stator 221. Once electric power supplied by the battery 50 shown in FIG. 1 is transmitted through the wire to the multiple coils of the inner rotor 222, electromotive force will be generated between the outer-ring stator 221 and the multiple coils to actuate the inner rotor 222 to generate rotational kinetic energy.

Further, referring collectively to FIGS. 3 and 4, the inside of the support seat 21 can be extended to form a radial inner wall 213 between the motor housing chamber 210 and the flywheel housing chamber 211. In other words, the motor housing chamber 210 and the flywheel housing chamber 211 are adjacent to each other but separated by the radial inner wall 213.

Further, the radial inner wall 213 is formed with an inner hole 214, and the inner hole 214 is used for fixing a built-in bearing 241. The support seat 21 is also formed with an end hole 215 along the assembly axial direction R corresponding to the inner hole 214. The end hole 215 is used for fixing an end bearing 242, so that the flywheel housing chamber 211 is positioned between the end bearing 242 and the built-in bearing 241. In addition, the rotary drive assembly 20 further comprises a transmission shaft 25. The transmission shaft 25 can sequentially go through the end bearing 242, a wheel hole 231 in the center of the flywheel 23, the built-in bearing 241, and a central hole 223 of the inner rotor 222, so that, through pivot connection of the built-in bearing 241 and the end bearing 242, the transmission shaft 25 can link and drive the flywheel 23 and the brushless DC motor 22 in a coaxial manner along the assembly axial direction R inside the motor housing chamber 210 and the flywheel housing chamber 211.

The inner-rotor brushless DC motor 22 of the present invention can be implemented as a non-sensing brushless DC motor or a sensing brushless DC motor. The main difference lie in that: a sensing brushless DC motor must be configured with a sensor to detect the position of the inner rotor 222 in relation to the outer-ring stator 221 and to generate a feedback signal, and the gun frame 11 must be configured with a micro-controller which is electrically connected to the sensor to check the feedback signal and control the time of operation of the sensing brushless DC motor, including the time to drive the inner rotor 222 to rotate or stop based on the feedback signals. As disclosed in FIGS. 3 and 4, after the sensing brushless DC motor 22 is configured inside the motor housing chamber 210, the sensor 70 is mounted via a fixing plate 71 on the axial port 210*a*, so that, when the sensing brushless DC motor 22 drives the flywheel 23 to rotate, the sensor 70 can detect the position of the inner rotor 222 in relation to the outer-ring stator 221 and send the feedback signal to the micro-controller (not shown in the figure) configured in the control circuit of the electric nail gun. Furthermore, conventional sensors such as a Hall sensor, a resolver, or an encoder can be effective implementations of the sensor 70 according to the invention.

Although the invention has been explained in relation to its preferred embodiment, it is to be understood that many other possible modifications and variations can be made without departing from the spirit and scope of the invention as hereinafter claimed.

The invention claimed is:

1. A rotary drive assembly of an electric nail gun, configured on a gun frame to drive a striker to fire a nail, the rotary drive assembly comprising:

a support seat, formed with a motor housing chamber and a flywheel housing chamber along an assembly axial direction, separated from each other;

an inner-rotor brushless DC motor, comprising an outer-ring stator and an inner rotor configured concentrically, the outer-ring stator being fixed on an axial inner wall of the motor housing chamber to actuate the inner rotor to generate rotational kinetic energy;

a flywheel, housed inside the flywheel housing chamber, and linked and driven by the inner rotor along the assembly axial direction via a transmission shaft;

wherein:

the motor housing chamber has an axial port along the assembly axial direction, open to the outside, and the axial port is formed by extending the axial inner wall outward; and the flywheel housing chamber has a radial port along the radial direction of the assembly axis, open to the outside, the radial port exposes part of the flywheel outside the support seat, for engagement with the striker to fire a nail, and the axial port is perpendicular to the radial port;

wherein said support seat is formed with a radial inner wall, and the motor housing chamber and the flywheel housing chamber are separated by the radial inner wall and are adjacent to each other.

2. The rotary drive assembly of an electric nail gun defined in claim 1, wherein said brushless DC motor is placed into the motor housing chamber via the axial port, whereas the flywheel is placed into the flywheel housing chamber via the radial port.

3. The rotary drive assembly of an electric nail gun defined in claim 1, wherein said radial inner wall is formed with an inner hole to fix a built-in bearing, and the built-in bearing is used for pivot connection of the transmission shaft so that the transmission shaft can be put through the inner hole and the radial inner wall to be connected with the inner rotor and the flywheel for transmission.

4. The rotary drive assembly of an electric nail gun defined in claim 3, wherein, along the assembly axial direction, the support seat is formed with an end hole corresponding to the inner hole, the end hole is used for fixing an end bearing, so that the transmission shaft can be pivoted between the end bearing and the built-in bearing to link and drive the inner rotor and the flywheel.

5. The rotary drive assembly of an electric nail gun defined in claim 4, wherein said flywheel housing chamber is positioned between the end bearing and the built-in bearing.

6. The rotary drive assembly of an electric nail gun defined in claim 1, wherein said brushless DC motor is a non-sensing brushless DC motor.

7. The rotary drive assembly of an electric nail gun defined in claim 1, wherein said brushless DC motor is a sensing brushless DC motor, the brushless DC motor further comprises a sensor installed on the axial port to detect the position of the inner rotor in relation to the outer-ring stator.

8. The rotary drive assembly of an electric nail gun defined in claim 7, wherein said gun frame is correspondingly configured with a micro-controller that is electrically connected to the sensor, the micro-controller is used to process a feedback signal from the sensor detecting the position of the inner rotor in relation to the outer-ring stator, and based on the feedback signal, the micro-controller drives the inner rotor to rotate.

9. The rotary drive assembly of an electric nail gun defined in claim 8, wherein said sensor is a Hall sensor, a resolver, or an encoder.

10. The rotary drive assembly of an electric nail gun defined in claim 1, wherein said gun frame is fixed with an electromagnet, the support seat is formed by a swing arm pivoted on the gun frame, and a return spring is configured between the swing arm and the gun frame.

11. The rotary drive assembly of an electric nail gun defined in claim 10, wherein said swing arm is driven by the electromagnet to swing and drives the return spring to store an elastic force, causing the flywheel to swing from an idle position to a driving position to be engaged with the striker to fire a nail, and the swing arm also receives the elastic force released by the return spring to move the flywheel from the driving position back to the idle position.

12. The rotary drive assembly of an electric nail gun defined in claim 1, wherein said support seat is formed by a fixing seat on the gun frame, the fixing seat bears the flywheel so that a wheel surface of the flywheel is at an idle position, the striker can move toward the wheel surface of the flywheel so that the idle position becomes a driving position for engagement and transmission.

13. A rotary drive assembly of an electric nail gun, comprising: a swing arm pivoted on a gun frame, and an inner-rotor brushless DC motor and a flywheel configured on the swing arm in a coaxial manner, wherein, the swing arm is formed with a motor housing chamber and a flywheel housing chamber, spaced along a rotation axis, the motor housing chamber has an axial port along the assembly axial direction, open to the outside and provided for assembly of the brushless DC motor and heat dissipation, the flywheel housing chamber has a radial port along the radial direction of the assembly axis, open to the outside and provided for assembly of the flywheel and outputting rotational kinetic energy, and the axial port is perpendicular to the radial port;

wherein said support seat is formed with a radial inner wall, the motor housing chamber and the flywheel housing chamber are separated by the radial inner wall and are adjacent to each other, the brushless DC motor and the flywheel are serially connected via a transmission shaft put through and pivoted on the radial inner wall and are adjacent to but separated by the radial inner wall.

14. The rotary drive assembly of an electric nail gun defined in claim 13, wherein said radial inner wall is formed with an inner hole to fix a built-in bearing, and the built-in bearing is used for pivot connection of the transmission shaft.

15. The rotary drive assembly of an electric nail gun defined in claim 14, wherein, along the assembly axial direction, the support seat is formed with an end hole corresponding to the inner hole, the end hole is used for fixing an end bearing, so that the transmission shaft can be pivoted between the end bearing and the built-in bearing to link and drive the inner rotor and the flywheel, and the flywheel housing chamber is positioned between the end bearing and the built-in bearing.

16. The rotary drive assembly of an electric nail gun defined in claim 13, wherein said brushless DC motor comprises an outer-ring stator and an inner rotor configured concentrically, the outer-ring stator is fixed on an axial inner wall of the motor housing chamber to actuate the inner rotor to generate rotational kinetic energy, and the axial port is formed by extending the axial inner wall outward.

17. The rotary drive assembly of an electric nail gun defined in claim 16, wherein said brushless DC motor is a non-sensing brushless DC motor.

18. The rotary drive assembly of an electric nail gun defined in claim 16, wherein said brushless DC motor is a sensing brushless DC motor, the brushless DC motor also comprises a sensor installed on the axial port to detect the position of the inner rotor in relation to the outer-ring stator.

19. The rotary drive assembly of an electric nail gun defined in claim 18, wherein said gun frame is correspondingly configured with a micro-controller that is electrically connected to the sensor, the micro-controller is used to process a feedback signal from the sensor detecting the position of the inner rotor in relation to the outer-ring stator, and based on the feedback signal, the micro-controller drives the inner rotor to rotate.

20. The rotary drive assembly of an electric nail gun defined in claim 18, wherein said sensor is a Hall sensor, a resolver, or an encoder.

21. The rotary drive assembly of an electric nail gun defined in claim 13, wherein said gun frame is fixed with an electromagnet that can drive the swing arm to swing from an idle position to a driving position, a return spring is configured between the swing arm and the gun frame to drive the swing arm to move from the driving position back to the idle position, when the swing arm is at the driving position, the flywheel can output rotational kinetic energy to drive a nailing rod to fire a nail.

* * * * *